US008991275B2

(12) United States Patent
Ishikawa (10) Patent No.: US 8,991,275 B2
(45) Date of Patent: Mar. 31, 2015

(54) TWO-WAY PUSH-PULL CHAIN AND RECIPROCATING ACTUATOR (71) Applicant: Tsubakimoto Chain Co., Osaka (JP)

(72) Inventor: Masayuki Ishikawa, Osaka (JP)

(73) Assignee: Tsubakimoto Chain Co., Osaka (JP)

(*) Notice: Subject to any disclaimer, the term of this patent is extended or adjusted under 35 U.S.C. 154(b) by 0 days.

(21) Appl. No.: 14/054,614

(22) Filed: Oct. 15, 2013

(65) Prior Publication Data

US 2014/0109701 A1 Apr. 24, 2014

(30) Foreign Application Priority Data

Oct. 18, 2012 (JP) ................................ 2012-231027

(51) Int. Cl.
F16H 27/02 (2006.01)
F16H 29/02 (2006.01)
F16H 29/20 (2006.01)
F16H 19/06 (2006.01)
F16G 13/20 (2006.01)

(52) U.S. Cl.
CPC .......... F16H 19/0636 (2013.01); F16G 13/20 (2013.01)
USPC ........................................... 74/89.2

(58) Field of Classification Search
CPC ............................ F16H 19/0636; F16H 21/04
USPC ...................... 74/89.2, 89.21, 89.22
See application file for complete search history.

(56) References Cited

U.S. PATENT DOCUMENTS

| 3,234,698 | A | * | 2/1966 | Kimblern ........................ 52/108 |
| 4,521,993 | A | * | 6/1985 | Tacheny et al. ................. 49/325 |
| 4,745,714 | A | * | 5/1988 | Matsutani ....................... 52/108 |
| 2009/0224006 | A1 | * | 9/2009 | Post et al. ..................... 222/333 |
| 2014/0000393 | A1 | * | 1/2014 | Rojo ........................... 74/89.21 |

FOREIGN PATENT DOCUMENTS

| JP | 3-105191 | 10/1991 |
| JP | 6-286834 | 10/1994 |
| JP | 2011-251795 | 12/2011 |

* cited by examiner

Primary Examiner — Justin Krause
(74) Attorney, Agent, or Firm — Sheridan Ross P.C.

(57) ABSTRACT

A link member includes a first pin hole, a second pin hole, a first engaging portion, and a second engaging portion. The second pin hole is an elongated hole extending in a longitudinal direction of a two-way push-pull chain. The pin is movably inserted into the second pin hole and fixed to the first pin hole. With the pin being movably inserted into the second pin hole, adjacent link members are expandable and contractible relative to each other by a length. The length is greater than a length of a portion where the first engaging portion contacts the second engaging portion in a state where the adjacent link members are contracted relative to each other.

7 Claims, 7 Drawing Sheets

TWO-WAY PUSH-PULL CHAIN AND RECIPROCATING ACTUATOR

BACKGROUND OF THE INVENTION

This application claims the benefit of Japanese Patent Application No. 2012-231027 filed Oct. 18, 2012, the entire content of which is incorporated herein by reference.

The present invention relates to a two-way push-pull chain formed by connecting a plurality of link members by means of pins, and a reciprocating actuator having the two-way push-pull chain.

Figure 7A:
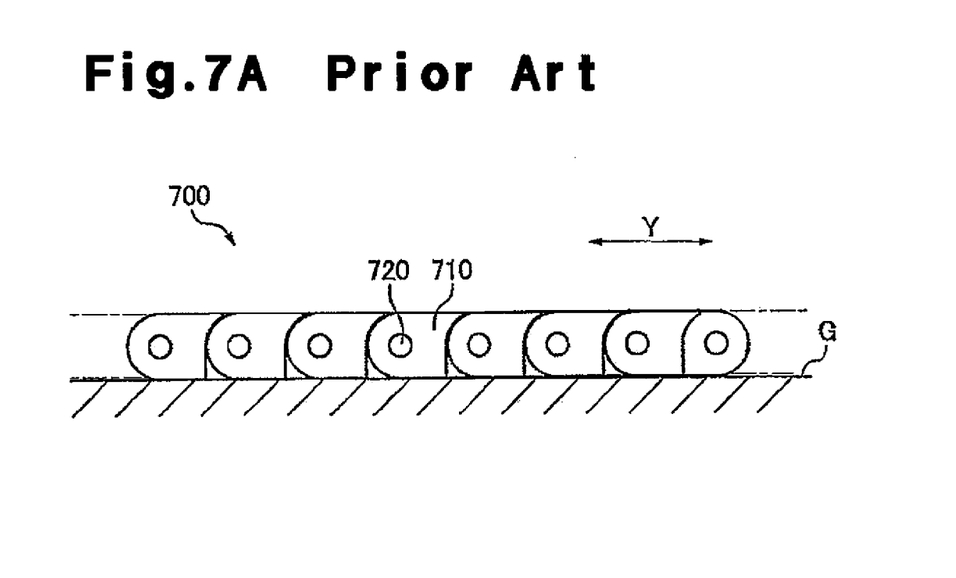
FIG. 7A is a side view illustrating a conventional block chain in a straight state thereof.
Figure 7B:
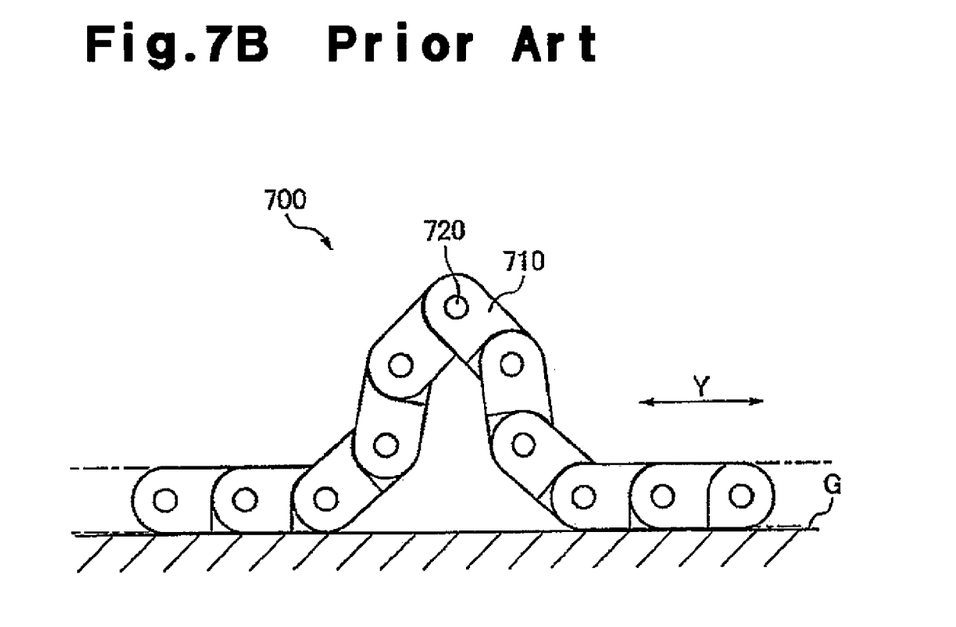
FIG. 7B is a side view illustrating the conventional block chain in a buckled state thereof.

There is known a two-way push-pull type block chain formed by connecting a plurality of link members by means of pins as disclosed in Japanese Patent Laid-Open No. 6-286834, Japanese Patent Laid-Open No. 2011-251795, and Japanese Utility Model Laid-Open No. 3-105191. For example, as illustrated in FIGS. 7A and 7B, a block chain 700 is formed by connecting a plurality of link members 710 arranged along a longitudinal direction Y by means of pins 720. When the drive force of an unillustrated sprocket is transmitted to the block chain 700, the block chain 700 slides on a guide portion G. Accordingly, the block chain 700 moves back and forth in the longitudinal direction Y.

The conventional block chain 700 is structured to mesh with the outer peripheral surface of the sprocket while being bent around the pin 720. Thus, when the block chain 700 is pressed from both ends thereof on the guide portion G, a part of the block chain 700 may be spaced apart from the guide portion G, as illustrated in FIG. 7B, and buckled, which prevents the block chain 700 from being moved by pushing the end portion thereof to a desired position.

In other words, the conventional block chain 700 does not satisfy both the need to mesh the block chain 700 with the outer peripheral surface of the sprocket by freely bending the block chain 700 and the need to move the block chain 700 by pushing the end portion of the block chain 700 to a desired position without buckling the block chain 700. The chain disclosed in Japanese Utility Model Laid-Open No. 3-105191 is structured to be bendable in only one direction by causing a projecting piece of the link member to abut against adjacent link members. Thus, the chain cannot mesh with the outer peripheral surface of the sprocket by bending the chain freely, and the chain may be buckled in a direction opposite to the bending direction of the chain.

SUMMARY OF THE INVENTION

It is an object of the present invention to provide a two-way push-pull chain satisfying both the need to mesh a chain with an outer peripheral surface of a sprocket by permitting free bending of the chain and the need to push an end portion of the chain to a desired position without buckling the chain and to provide a reciprocating actuator having the two-way push-pull chain.

In order to solve the above problems, a first aspect of the present invention provides a two-way push-pull chain formed by connecting a plurality of link members arranged along a longitudinal direction of the two-way push-pull chain by means of pins and having a first end and a second end. The second end is opposite to the first end. The link member includes: a first pin hole provided on the first end of the link member; a second pin hole provided on the second end of the link member; a first engaging portion provided on the first end of the link member; and a second engaging portion provided on the second end of the link member and engageable with the first engaging portion of an adjacent link member. Either of the first pin hole and the second pin hole is an elongated hole extending in the longitudinal direction and the other pin hole is a fixing hole. The pin is movably inserted into the elongated hole and fixed to the fixing hole. With the pin being movably inserted into the elongated hole, adjacent link members are expandable and contractible relative to each other by a predetermined length. The predetermined length is greater in the longitudinal direction that the length of a portion in which the first engaging portion contacts the second engaging portion in a state where the adjacent link members are contracted relative to each other.

In order to solve the above problems, a second aspect of the present invention provides a reciprocating actuator having the two-way push-pull chain. The reciprocating actuator includes: a two-way push-pull chain; a sprocket meshing with the two-way push-pull chain to transmit power to the two-way push-pull chain; an actuated portion attached to the first end of the two-way push-pull chain and moved by a push/pull action of the two-way push-pull chain; and a guide portion guiding the first end of the two-way push-pull chain and the actuated portion in a forward and backward direction.

DETAILED DESCRIPTION OF THE PREFERRED EMBODIMENTS

First Embodiment

The following is a description of a reciprocating actuator 10 according to a first embodiment of the present invention and a two-way push-pull chain 100 of the reciprocating actuator 10 with reference to FIGS. 1 to 4B. In the following description, a chain longitudinal direction and a chain lateral direction will be described as a longitudinal direction Y and a lateral direction X respectively.

Figure 1:
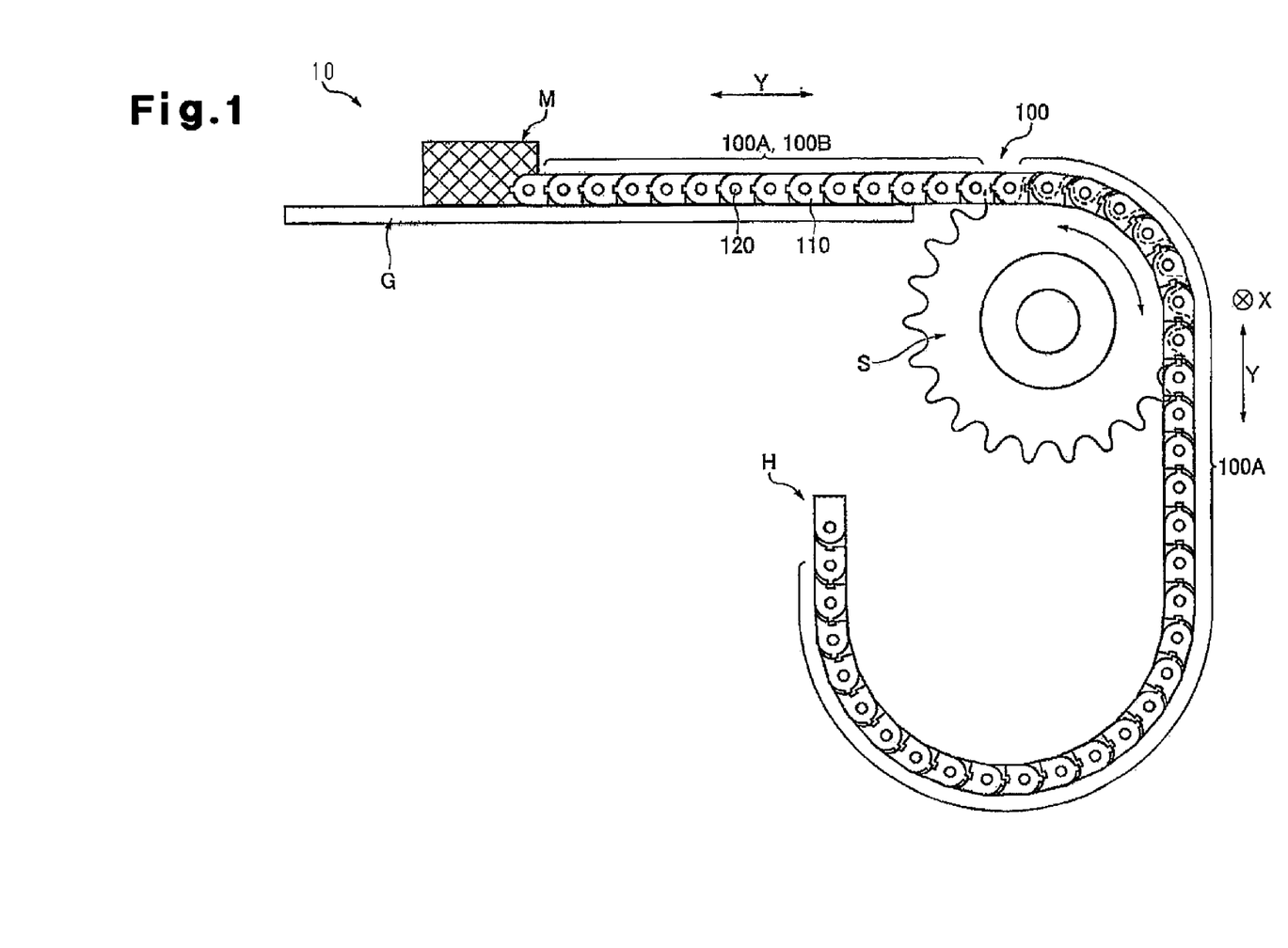
FIG. 1 is a schematic view of a reciprocating actuator having a two-way push-pull chain according to a first embodiment of the present invention.
Figure 2:
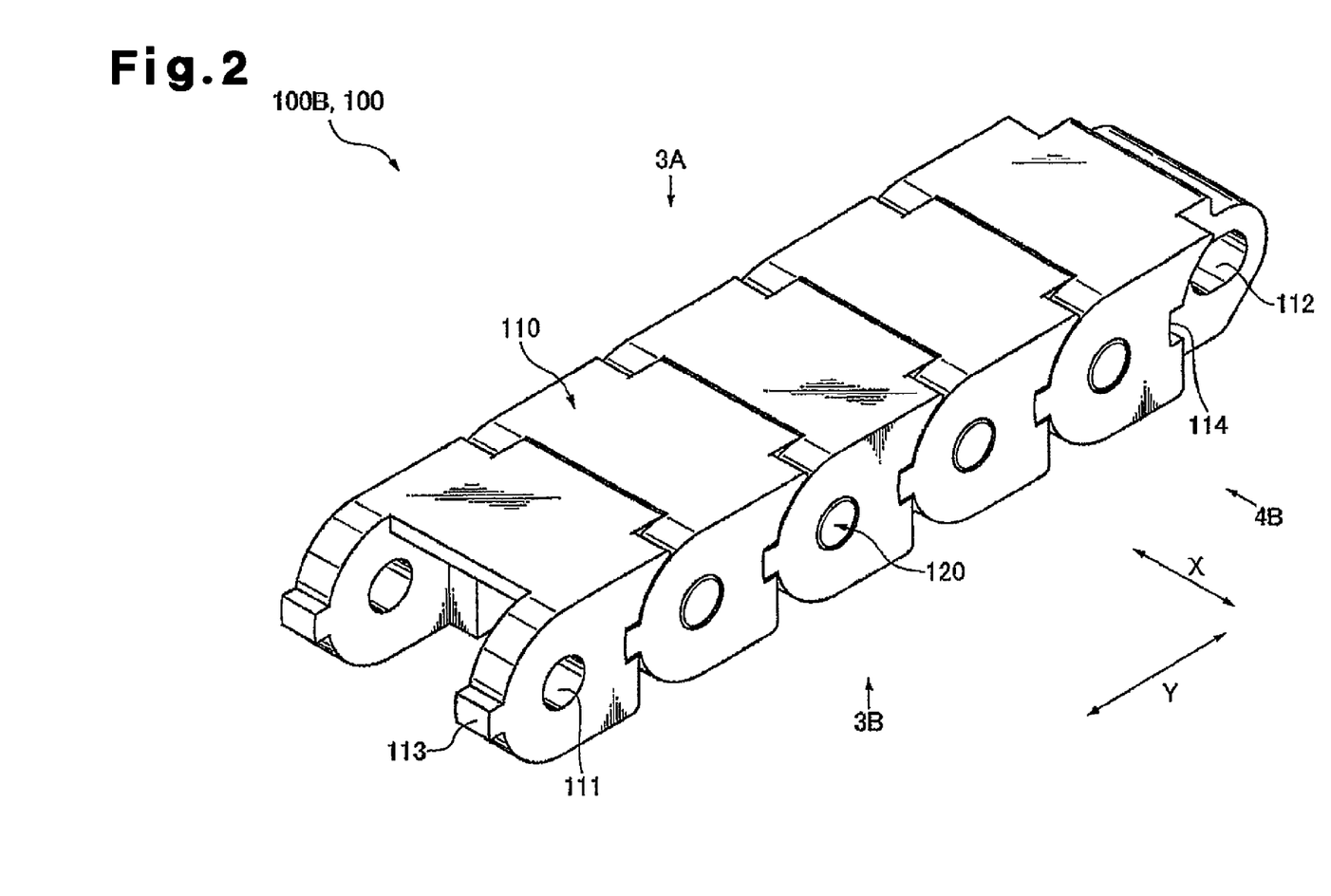
FIG. 2 is a perspective view illustrating the two-way push-pull chain in a contracted state thereof.

As illustrated in FIG. 1, the reciprocating actuator 10 includes: the two-way push-pull chain 100, a sprocket S, an actuated portion M, and a guide portion G. The sprocket S meshes with the two-way push-pull chain 100 to transmit power to the two-way push-pull chain 100. The actuated portion M is attached to a first end of the two-way push-pull chain 100 and moved by a push/pull action of the two-way push-pull chain 100.

The guide portion G guides the first end of the two-way push-pull chain 100 and the actuated portion M in a forward and backward direction thereof. This makes it possible to push and pull the actuated portion M by the first end of the two-way push-pull chain 100. The actuated portion M is configured to be attachable to a sensor or a camera. For example, the actuated portion M can enter and leave the inside of a hole of an object to be inspected and the inside of a tubular body.

The second end of the two-way push-pull chain 100 is fixed to a fixing portion H. The two-way push-pull chain 100 is expandable and contractible in the longitudinal direction Y by an external force and/or its own weight. In the two-way push-pull chain 100, the weight of the two-way push-pull chain 100 acts on a portion between the fixing portion H and the sprocket S. Thus, as illustrated by 100A in FIG. 1, the portion between the fixing portion H and the sprocket S in the two-way push-pull chain 100 is always in tension and extended downward.

When the sprocket S is rotated counterclockwise in FIG. 1, the first end of the two-way push-pull chain 100 moves to the left and pushes the actuated portion M to the left in FIG. 1 while being guided by the guide portion G. At this time, the weight of a portion including the actuated portion M and the first end of the two-way push-pull chain 100 acts on a portion in the two-way push-pull chain 100 between the actuated portion M and the sprocket S. Thus, as illustrated by 100B in FIG. 1, the portion of the two-way push-pull chain 100 between the actuated portion M and the sprocket S is contracted and under compression because it is pushed by both a portion near the actuated portion M and a portion near the sprocket S.

When the sprocket S is rotated clockwise in FIG. 1, the first end of the two-way push-pull chain 100 moves to the right and pulls the actuated portion M to the right in FIG. 1 while being guided by the guide portion G. At this time, the weight of a portion including the actuated portion M and the first end of the two-way push-pull chain 100 acts on a portion in the two-way push-pull chain 100 between the actuated portion M and the sprocket S. Thus, as illustrated by 100A in FIG. 4A, the portion of the two-way push-pull chain 100 between the actuated portion M and the sprocket S is expanded and under tension because it is pulled from both a portion near the actuated portion M and a portion near the sprocket S.

Then, the configuration of the two-way push-pull chain 100 will be described in further detail.

As illustrated in FIGS. 2 to 4B, the two-way push-pull chain 100 is configured by connecting a plurality of link members 110 arranged along the longitudinal direction Y each by means of a pin 120. The link member 110 includes a first pin hole 111, a second pin hole 112, a first engaging portion 113, and a second engaging portion 114. The first pin hole 111 is provided on the first end of the link member 110.

The second pin hole 112 is provided on the second end of the link member 110, opposite to the first pin hole 111. The first engaging portion 113 is provided on the first end of the link member 110. The second engaging portion 114 is provided on the second end of the link member 110, opposite to the first engaging portion 113. The second engaging portion 114 is engageable with the first engaging portion 113 of the adjacent link member 110.

Figure 4A:
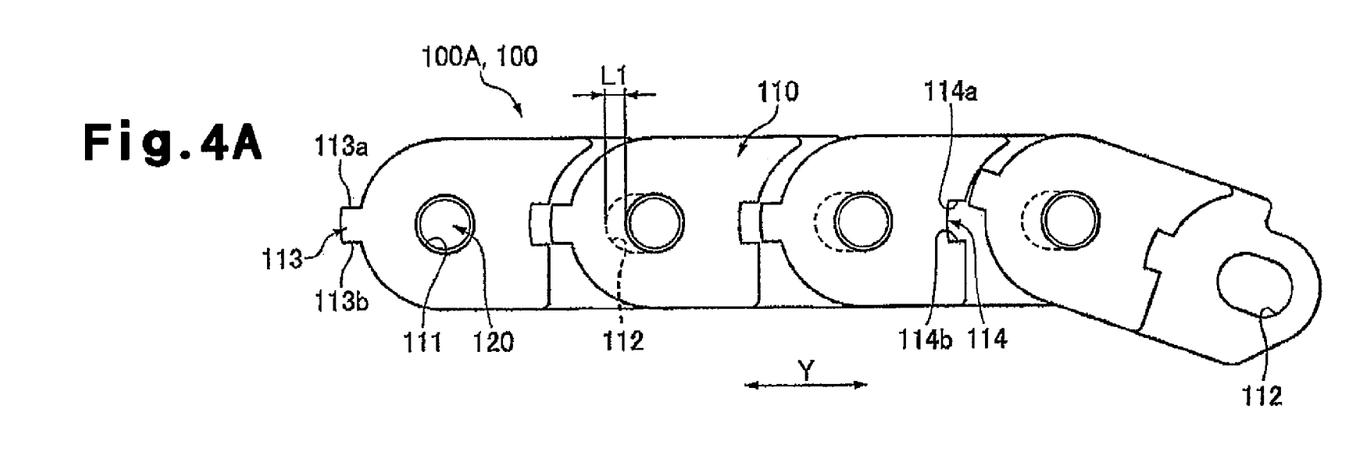
FIG. 4A is a side view illustrating the two-way push-pull chain in an expanded state thereof.

The second pin hole 112 is an elongated hole extending in the longitudinal direction Y. The pin 120 is movably inserted into the second pin hole 112 and is fixed to the first pin hole 111. With the pin 120 being movably fitted into the second pin hole 112, the adjacent link members 110 are expandable and contractible relative to each other by a length L1. As illustrated by 100B in FIG. 4B, L2 denotes the length in the longitudinal direction Y of a portion where the first engaging portion 113 contacts the second engaging portion 114 in a state where the adjacent link members 110 are contracted relative to each other. The length L1 is greater than the length L2. Thus, as illustrated in FIG. 4A, the first engaging portion 113 can be disengaged from the second engaging portion 114 in a state where the adjacent link members 110 are expanded away from each other. When the link members 110 are expanded relative to one another, the two-way push-pull chain 100 can be bent in any direction.

Figure 4B:
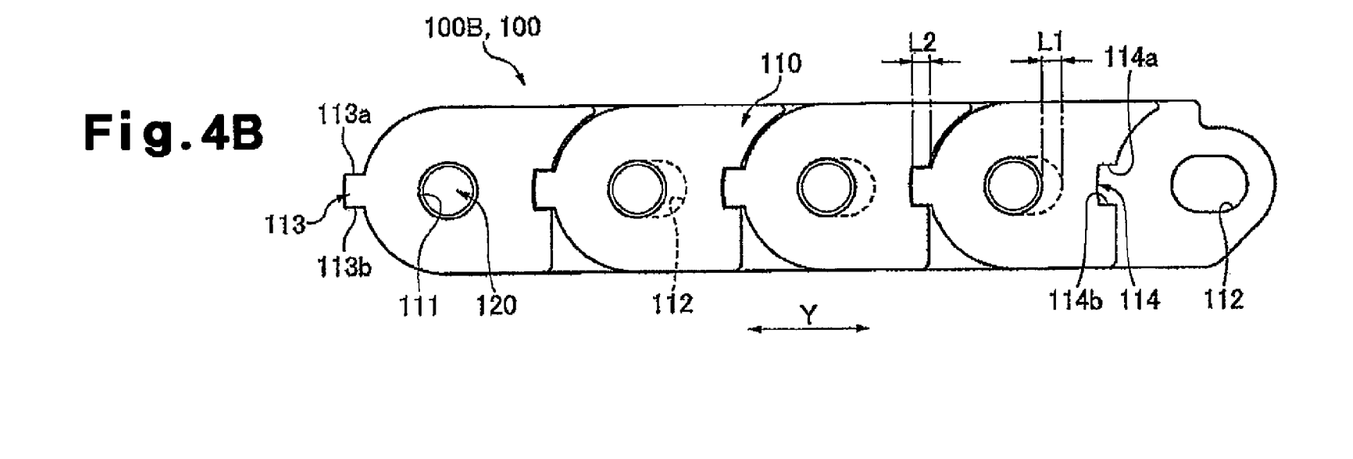
FIG. 4B is a side view illustrating the two-way push-pull chain in a contracted state thereof viewed from 4B of FIG. 2.

As illustrated by 100B in FIG. 4B, the first engaging portion 113 contacts the second engaging portion 114 in a state where the adjacent link members 110 are contracted relative to each other. Accordingly, the two-way push-pull chain 100 is not bent in any direction. In this case, the two-way push-pull chain 100 is switched between a state where the adjacent link members 110 are expanded relative to each other and a state where the adjacent link members 110 are contracted relative to each other by an external force and/or its own weight. At this time, the adjacent link members 110 are switched between a state where the first engaging portion 113 is engaged with the second engaging portion 114 and a state where the first engaging portion 113 is disengaged from the second engaging portion 114.

Figure 3A:
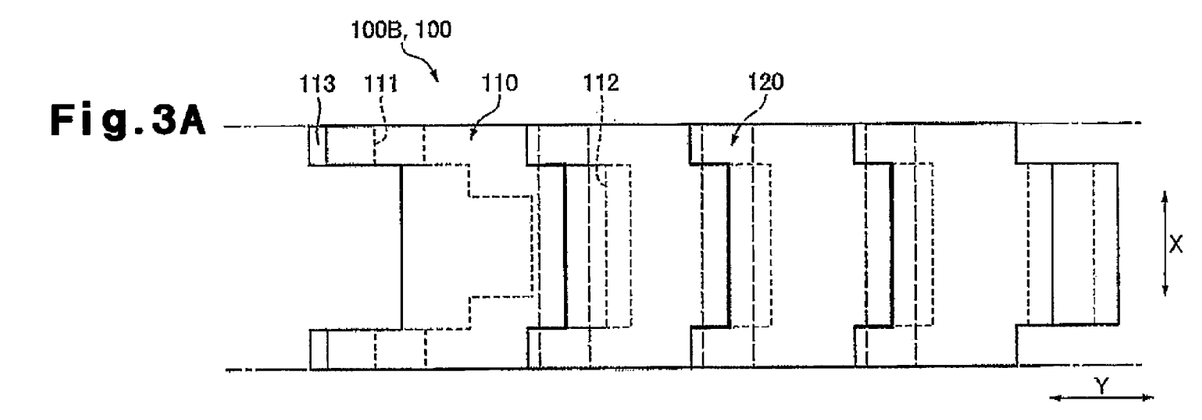
FIG. 3A is a plan view of the two-way push-pull chain viewed from 3A of FIG. 2.
Figure 3B:
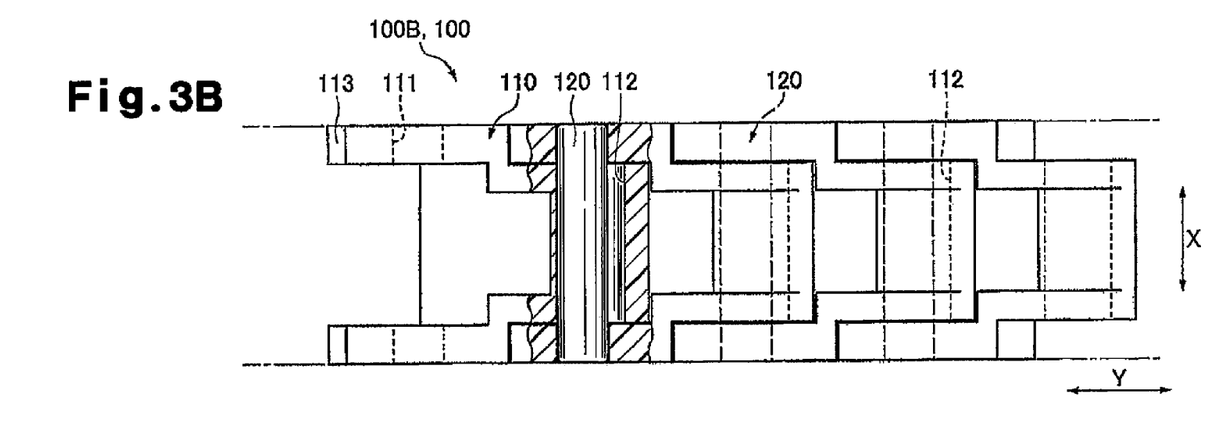
FIG. 3B is a bottom view of the two-way push-pull chain viewed from 3B of FIG. 2.

In the latter case, the two-way push-pull chain 100 can be meshed with the outer peripheral surface of the sprocket S. In the former case, the portion including the first end of the two-way push-pull chain 100 can be moved to a desired position by being pushed forward without being buckled in the manner of FIG. 7B. Specifically, as illustrated in FIG. 3B, the link member 110 is formed such that the first end of the link member 110 contacts both end portions of the second end of the adjacent link member 110, that is, the link member 110 is formed like a so-called offset link. In other words, the link member 110 is formed such that the first pin hole 111 is located outward of the second pin hole 112.

Further, according to the first embodiment, the first engaging portion 113 is a projected portion projecting in the longitudinal direction, and the second engaging portion 114 is a recessed portion shaped to receive and engage with the first engaging portion 113. Accordingly, the first engaging portion 113 meshes with the second engaging portion 114 in a state where the adjacent link members 110 are contracted relative to each other. Accordingly, the two-way push-pull chain 100 is prevented from bending in any direction.

As illustrated in FIGS. 4A and 4B, the first engaging portion 113 includes a first surface 113a and a second surface 113b. Likewise, the second engaging portion 114 includes a first surface 114a and a second surface 114b. The first surfaces 113a and 114a and the second surfaces 113b and 114b extend in substantially the same direction as a radius of the pin 120. Thus, even if a bending force acts on the two-way push-pull chain 100, a component force hardly acts on each of the first surfaces 113a and 114a and the second surfaces 113b and 114b. Therefore, the force for regulating the bending of the two-way push-pull chain 100 is maximized.

In addition, the first surface 113a of the first engaging portion 113 is parallel and opposite to the first surface 114a of the second engaging portion 114. Likewise, the second surface 113b of the first engaging portion 113 is parallel and opposite to the second surface 114b of the second engaging portion 114. Thus, when the adjacent link members 110 expand and contract relative to each other, the force for regulating the bending thereof can be maximized and the adjacent link members 110 can smoothly expand and contract relative to each other.

The first embodiment has the following effects.

(1) The link member 110 has the first pin hole 111, the second pin hole 112, the first engaging portion 113, and the second engaging portion 114. The second pin hole 112 is an elongated hole extending in the chain longitudinal direction Y. The pin 120 is movably inserted into the second pin hole 112 and fixed to the first pin hole 111. With the pin 120 being movably inserted into the second pin hole 112, the adjacent link members 110 are expandable and contractible relative to each other by the length L1. The length L1 is greater than the length L2 (measured in the longitudinal direction of the chain 100) of a portion where the first engaging portion 113 contacts the second engaging portion 114 in a state where the adjacent link members 110 are contracted relative to each other. This configuration allows the two-way push-pull chain 100 to be meshed with the outer peripheral surface of the sprocket S and to be pushed forward without buckling a portion that includes the first end of the two-way push-pull chain 100. In other words, this configuration can satisfy both the need to mesh the two-way push-pull chain 100 with the outer peripheral surface of the sprocket S by permitting free bending of the two-way push-pull chain 100 and the need to move the chain 100 by pushing the first end of the two-way push-pull chain 100 to a desired position without the occurrence of buckling.

(2) The first engaging portion 113 is a projected portion projecting in the longitudinal direction Y and the second engaging portion 114 is a recessed portion engaging with the first engaging portion 113. This configuration can reliably allow the two-way push-pull chain 100 to be pushed without buckling the portion that includes the first end of the two-way push-pull chain 100.

(3) The first engaging portion 113 includes the first surface 113a and the second surface 113b. Likewise, the second engaging portion 114 includes the first surface 114a and the second surface 114b. The first surfaces 113a and 114a and the second surfaces 113b and 114b extend both in the longitudinal direction Y and in the lateral direction X. This configuration reliably permits the two-way push-pull chain 100 to be pushed forward without buckling the portion that includes the first end of the two-way push-pull chain 100.

(4) The reciprocating actuator 10 includes the two-way push-pull chain 100, the sprocket S, the actuated portion M, and the guide portion G. This configuration allows the two-way push-pull chain 100 to be meshed with the outer peripheral surface of the sprocket S and to be pushed forward without buckling the portion that includes the first end of the two-way push-pull chain 100.

Second Embodiment

Figure 5A:
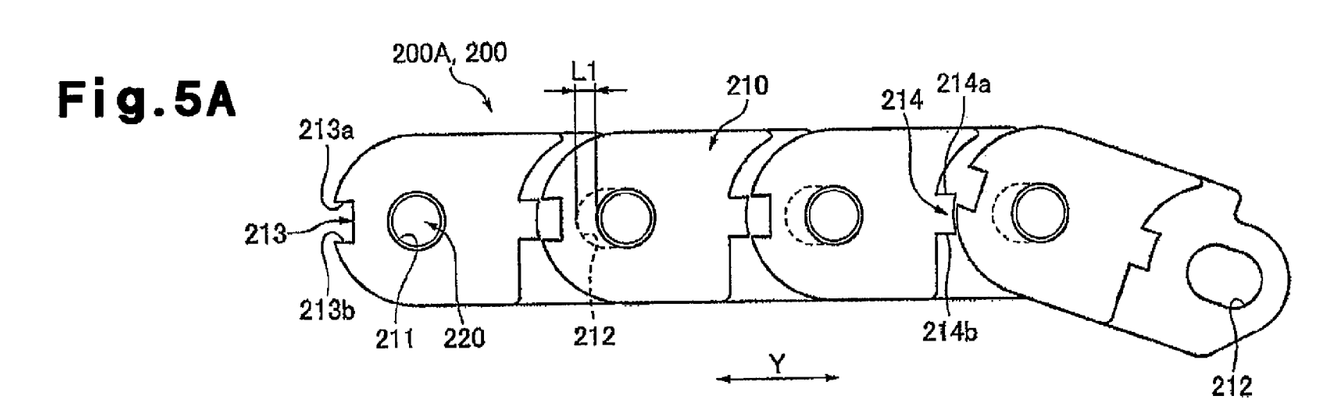
FIG. 5A is a side view illustrating a two-way push-pull chain in an expanded state thereof according to a second embodiment of the present invention.
Figure 5B:
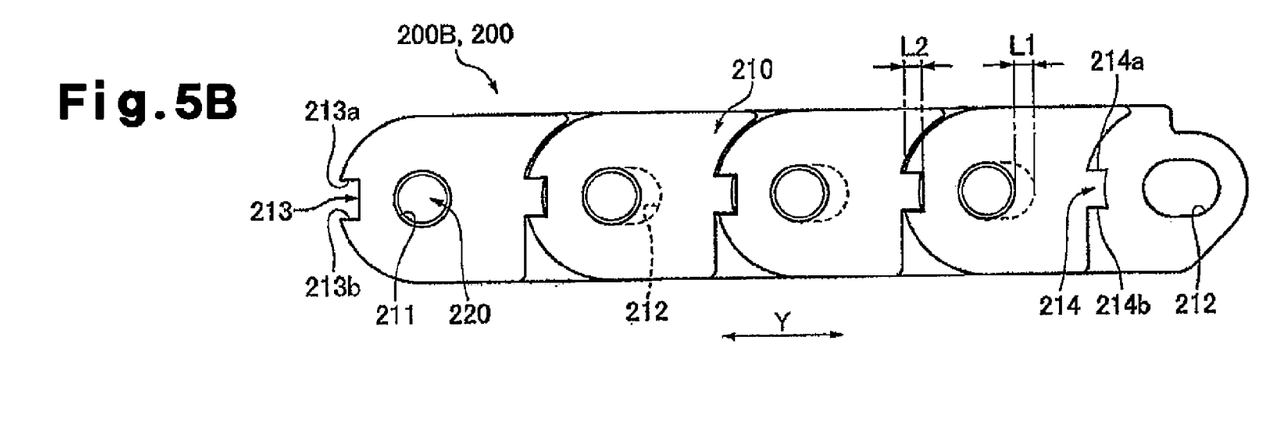
FIG. 5B is a side view illustrating the two-way push-pull chain in a contracted state thereof according to the second embodiment of the present invention.

There follows a description of a two-way push-pull chain 200 according to a second embodiment of the present invention with reference to FIGS. 5A and 5B.

The two-way push-pull chain 200 reverses the relationship between the recessed portion and the projected portion of the first engaging portion 113 and the second engaging portion 114 of the two-way push-pull chain 100 according to the first embodiment. In the following description of the two-way push-pull chain 200, the description of matters common to the two-way push-pull chain 100 according to the first embodiment will be omitted, and the reference numerals of the second embodiment (the 200 series) have the same lower two digits as corresponding reference numbers of the first embodiment.

As illustrated in FIGS. 5A and 5B, a first engaging portion 213 is a recessed portion and a second engaging portion 214 is a projected portion engaging with the first engaging portion 213. Thereby, the first engaging portion 213 meshes with the second engaging portion 214 in a state where adjacent link members 210 are contracted relative to each other. Accordingly, the two-way push-pull chain 200 cannot be bent in any direction.

In addition, the first engaging portion 213 includes a first surface 213a and a second surface 213b. Likewise, the second engaging portion 214 includes a first surface 214a and a second surface 214b. The first surfaces 213a and 214a and the second surfaces 213b and 214b extend both in the longitudinal direction Y and in the lateral direction X. According to this configuration, even if a bending force acts on the two-way push-pull chain 200, a component force does not occur on each of the first surfaces 213a and 214a and the second surfaces 213b and 214b. Therefore, the force for regulating the bending of the two-way push-pull chain 200 is maximized. In other words, the two-way push-pull chain 200, in which the relationship between the recessed portion and the projected portion of the first engaging portion 213 and the second engaging portion 214 is reversed, provides the same effects as the two-way push-pull chain 100 of the first embodiment.

Third Embodiment

Figure 6A:
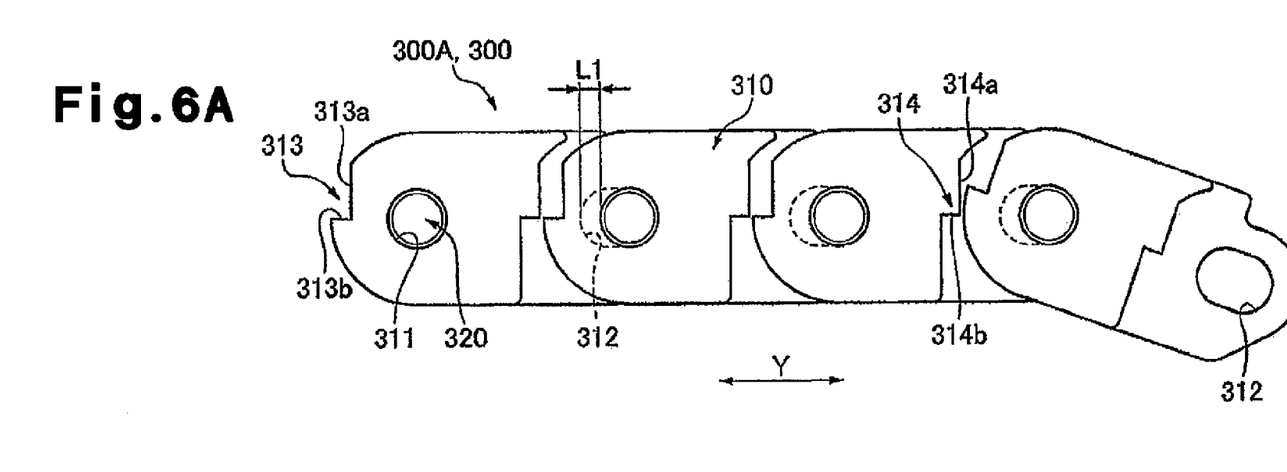
FIG. 6A is a side view illustrating a two-way push-pull chain in an expanded state thereof according to a third embodiment of the present invention.
Figure 6B:
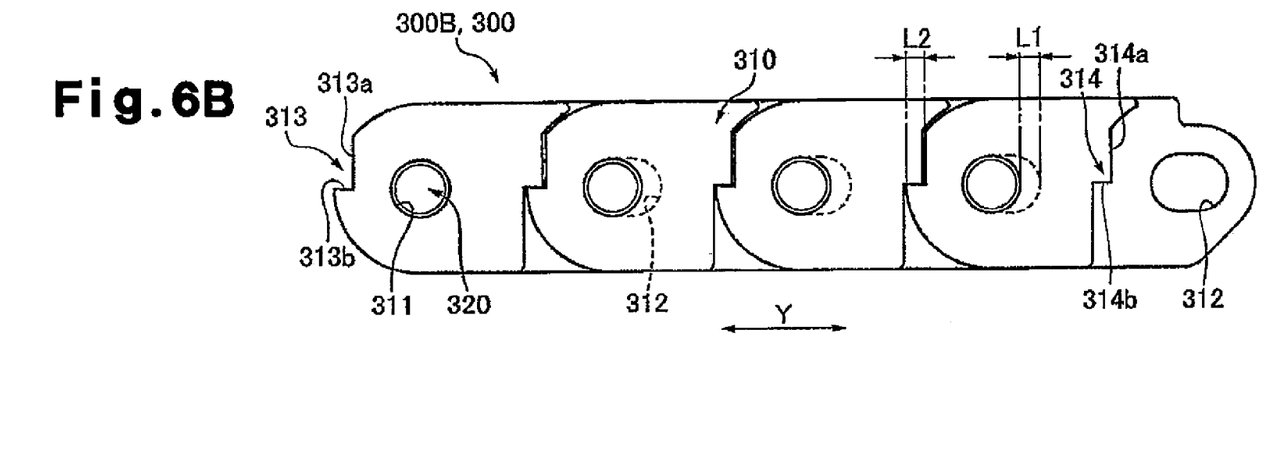
FIG. 6B is a side view illustrating the two-way push-pull chain in a contracted state thereof according to the third embodiment of the present invention.

There follows a description of a two-way push-pull chain 300 according to a third embodiment of the present invention with reference to FIGS. 6A and 6B.

The two-way push-pull chain 300 changes the shape of the first engaging portion 113 and the second engaging portion 114 of the two-way push-pull chain 100 of the first embodiment. In the following description of the two-way push-pull chain 300, descriptions common to the two-way push-pull chain 100 of the first embodiment will be omitted, and the reference numbers of the third embodiment (the 300 series) have the same lower two digits as the corresponding reference numbers of the first embodiment.

As illustrated in FIGS. 6A and 6B, a first engaging portion 313 is a recessed portion and a second engaging portion 314 is a projected portion engaging with the first engaging portion 313. Thereby, the first engaging portion 313 meshes with the second engaging portion 314 in a state where adjacent link members 310 are contracted relative to each other. Accordingly, the two-way push-pull chain 300 cannot be bent in any direction. In addition, the first engaging portion 313 includes a first surface 313a and a second surface 313b. The first surface 313a faces the longitudinal direction Y; and the second surface 313b extends both in the longitudinal direction Y and in the lateral direction X. Likewise, the second engaging portion 314 includes a first surface 314a and a second surface 314b. The first surface 314a faces the longitudinal direction Y; and the second surface 314b extends both in the longitudinal direction Y and in the lateral direction X.

As illustrated by 300B in FIG. 6B, the first surface 313a of the first engaging portion 313 is in surface contact with the first surface 314a of the second engaging portion 314 in a state where the two-way push-pull chain 300 is contracted. At the same time, the second surface 313b of the first engaging portion 313 is in surface contact with the second surface 314b of the second engaging portion 314. Here, the second surface 313b of the first engaging portion 313 and the second surface 314b of the second engaging portion 314 extend in a radial direction of the pin 320. Accordingly, this configuration can regulate the lifting of the two-way push-pull chain 300 from the guide portion G and bending thereof. Also, as illustrated in FIGS. 6A and 6B, the first surface 313a of the first engaging portion 313 and the first surface 314a of the second engaging portion 314 are highly inclined with respect to a radius of the pin 320. In this case, the first surfaces 313a and 314a are not perpendicular to a radius of the pin, which can regulate the bending of the two-way push-pull chain 300.

Note that the first to third embodiments may be changed as follows.

In the first embodiment, the pin 120 is fixed to the first pin hole 111, which is located outside the second pin hole 112. However, the pin 120 may be fixed to the second pin hole 112 by preparing the first pin hole 111 as an elongated hole instead of by preparing the second pin hole 112 as an elongated hole.

In the first embodiment, the chain is prevented from being bent in any direction by engaging the first engaging portion 113 with the second engaging portion 114. However, the first engaging portion 113 and the second engaging portion 114 may be of any shape as long as the bending of the chain can be regulated by engaging the first engaging portion 113 with the second engaging portion 114.

In each of the above embodiments, the two-way push-pull chain may be made of any material. Also, the two-way push-pull chain may be constituted by any chain such as a roller chain, a bushing chain, or the like as long as the chain has link members.

In each of the above embodiments, a drive motor may be used as a sprocket driving source. Also, the two-way push-pull chain may be driven by a force obtained by manually rotating a rotary handle.

The invention claimed is:

1. A two-way push-pull chain formed by connecting a plurality of link members arranged along a longitudinal direction of the two-way push-pull chain by pins and having a first end and a second end, wherein the second end is opposite to the first end, and wherein the link member comprises:
   a first pin hole provided on a first end of the link member;
   a second pin hole provided on a second end of the link member;
   a first engaging portion provided on the first end of the link member; and
   a second engaging portion provided on the second end of the link member and engageable with a first engaging portion of an adjacent link member, and wherein
   one of the first pin hole and the second pin hole comprises an elongated hole extending through the link member in a lateral direction and being elongated in the longitudinal direction, and the other pin hole comprises a fixing hole;
   a pin movably fitted in the elongated hole and fixed to the fixing hole, such that the pin is moveable in a longitudinal direction with respect to the elongated hole and substantially fixed in a longitudinal direction with respect to the fixing hole;
   wherein the pin is rotatable within the first pin hole and the second pin hole;
   with the pin being movably fitted in the elongated hole, adjacent link members are expandable and contractible relative to each other by a predetermined distance in a longitudinal direction in which the chain is adapted to receive a compression force; and
   the predetermined distance is equivalent to a maximum displacement of the link member with respect to the adjacent link member, and the predetermined distance is greater than a distance in the longitudinal direction along which the first engaging portion contacts the second engaging portion when adjacent link members are contracted relative to each other.

2. The two-way push-pull chain according to claim 1, wherein
   the first engaging portion is a projected portion projecting in the longitudinal direction; and
   the second engaging portion is a recessed portion engaging with the projected portion.

3. The two-way push-pull chain according to claim 1, wherein the first engaging portion and the second engaging portion have surfaces extending both in the longitudinal direction and a lateral direction of the two-way push-pull chain.

4. The two-way push-pull chain according to claim 1, wherein the first engaging portion and the second engaging portion have surfaces extending in substantially the same direction as a radius of the pin.

5. The two-way push-pull chain according to claim 1, wherein
   the first engaging portion has first and second surfaces on a first side and a second side of the two-way push-pull chain, respectively;
   the second engaging portion has first and second surfaces on a first side and a second side of the two-way push-pull chain, respectively;
   the first surface of the first engaging portion is parallel and opposed to the first surface of the second engaging portion; and
   the second surface of the first engaging portion is parallel and opposed to the second surface of the second engaging portion.

6. The two-way push-pull chain according to claim 1, wherein the two-way push-pull chain forms part of a reciprocating actuator, and the reciprocating actuator comprises:
   a sprocket meshing with the two-way push-pull chain to transmit power to the two-way push-pull chain;
   an actuated portion attached to a first end of the two-way push-pull chain and moved by a push/pull action of the two-way push-pull chain; and
   a guide portion that guides the first end of the two-way push-pull chain and the actuated portion in a forward and backward direction.

7. The two-way push-pull chain according to claim 1, wherein the first engaging portion comprises two parallel extensions of the link member, each of the two parallel extensions comprising an elongated hole adapted for alignment with a fixing hole of an adjacent link member.

* * * * *